United States Patent
Williams et al.

(10) Patent No.: US 6,315,528 B1
(45) Date of Patent: Nov. 13, 2001

(54) TERMINAL CONNECTION IN SMALL AREA OF SCROLL COMPRESSOR AND METHOD FOR CARRYING OUT SAME

(75) Inventors: John R. Williams; Tracy Milliff, both of Bristol, VA (US)

(73) Assignee: Scroll Technologies, Arkadelphia, AR (US)

( * ) Notice: Subject to any disclaimer, the term of this patent is extended or adjusted under 35 U.S.C. 154(b) by 0 days.

(21) Appl. No.: 09/320,942

(22) Filed: May 27, 1999

(51) Int. Cl.[7] .................................................. F04B 17/00
(52) U.S. Cl. ...................... 417/410.5; 439/685; 340/649; 417/422
(58) Field of Search .......................... 310/68 C; 417/32, 417/422, 410.1, 410.5; 418/55, 55.1; 428/34.3; 439/282, 620, 685, 181; 340/649

(56) References Cited

U.S. PATENT DOCUMENTS

| | | | |
|---|---|---|---|
| 3,850,496 | * | 11/1974 | Hague .................................. 439/685 |
| 4,113,341 | * | 9/1978 | Hughes ................................ 439/620 |
| 4,523,798 | * | 6/1985 | Barrows et al. ..................... 439/685 |
| 4,791,329 | * | 12/1988 | Ubukata et al. ................... 310/68 C |
| 4,840,547 | * | 6/1989 | Fry ....................................... 417/422 |
| 4,911,620 | * | 3/1990 | Richardson, Jr. et al. ............ 418/55 |
| 4,964,788 | * | 10/1990 | Itameri-Kinter et al. ............ 417/422 |
| 5,126,196 | * | 6/1992 | Yamada et al. ..................... 428/34.3 |
| 5,129,843 | * | 7/1992 | Bowsky et al. ..................... 439/685 |
| 5,131,858 | * | 7/1992 | Heimbrock .......................... 439/181 |
| 5,145,417 | * | 9/1992 | Honkomp et al. ................... 439/685 |
| 5,215,451 | * | 6/1993 | Hara et al. .......................... 418/55.1 |
| 5,391,061 | * | 2/1995 | Iizuka et al. ....................... 417/410.1 |
| 5,584,716 | * | 12/1996 | Bergman ............................. 439/282 |
| 5,690,475 | * | 11/1997 | Yamada et al. ....................... 417/32 |
| 6,028,523 | * | 2/2000 | Thibodeaux et al. ................ 340/649 |

FOREIGN PATENT DOCUMENTS

| | | |
|---|---|---|
| 0846863 A1 | 6/1998 | (EP) . |
| 60257734 | 12/1985 | (JP) . |
| 60261339 | 12/1985 | (JP) . |
| 63094092 | 4/1988 | (JP) . |

OTHER PUBLICATIONS

Search Report–Dec. 6, 2000.

* cited by examiner

Primary Examiner—Teresa Walberg
Assistant Examiner—Leonid Fastovsky
(74) Attorney, Agent, or Firm—Carlson, Gaskey & Olds

(57) ABSTRACT

A compressor is provided with an electrical connection within the length of the stator winding or another component, to reduce the total height of the compressor. The compressor includes a motor having a stator and a rotor, wherein the stator extends along an axis for a fixed axial length and the rotor rotates about the axis. The compressor also includes a set of terminal pins extending through the housing for providing electrical connection to the motor. The terminal pins are mounted onto the inside of the housing of the compressor and within the axial length of the stator. A connector having cooperating slots slides in a direction generally parallel, tangential or a combination thereof to the axis of rotation to connect the terminal pins to the motor.

11 Claims, 4 Drawing Sheets

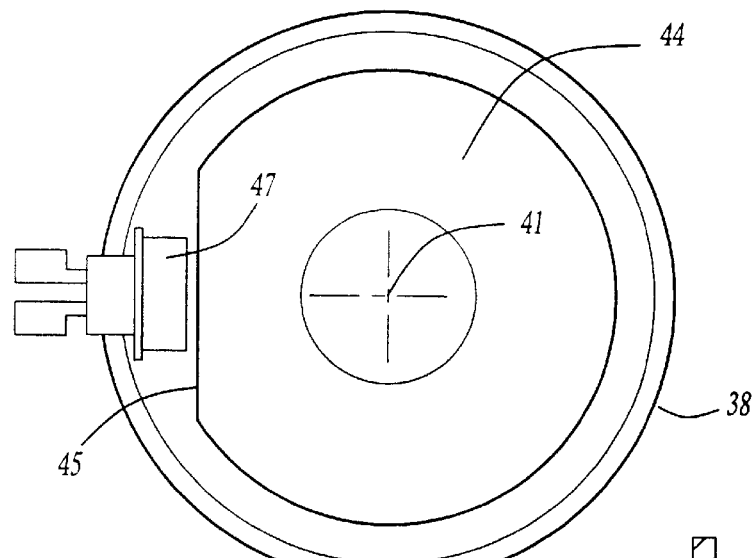
Fig-2
Fig-3
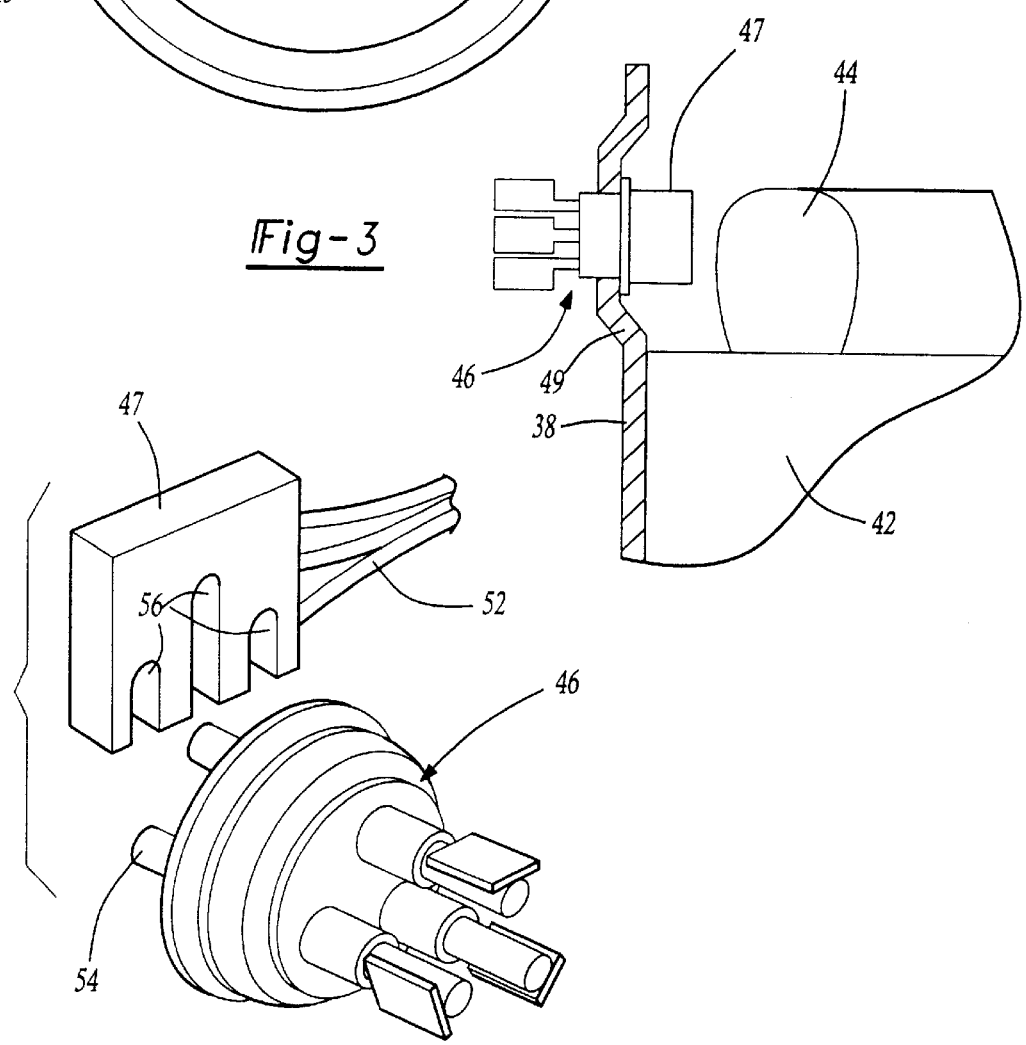
Fig-4

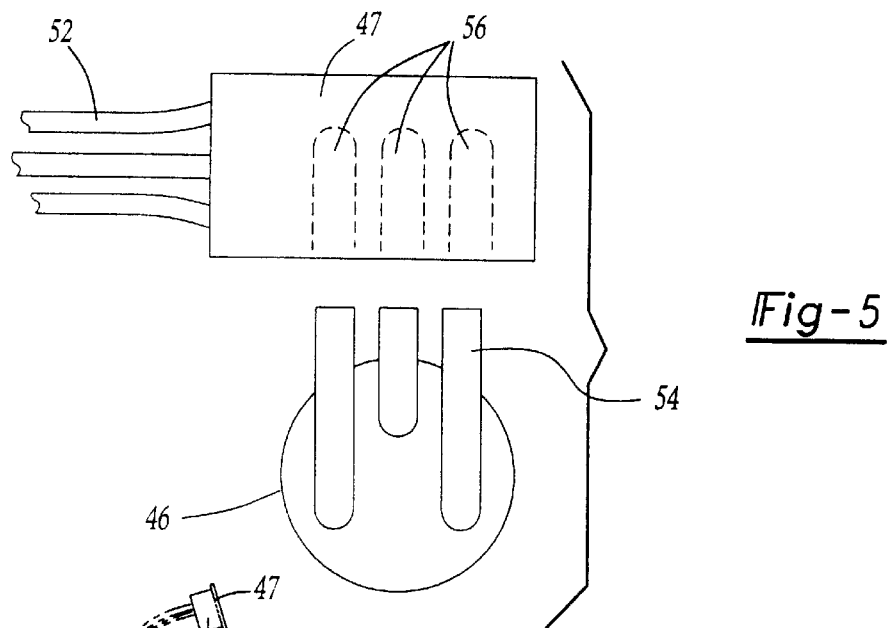
*Fig-5*
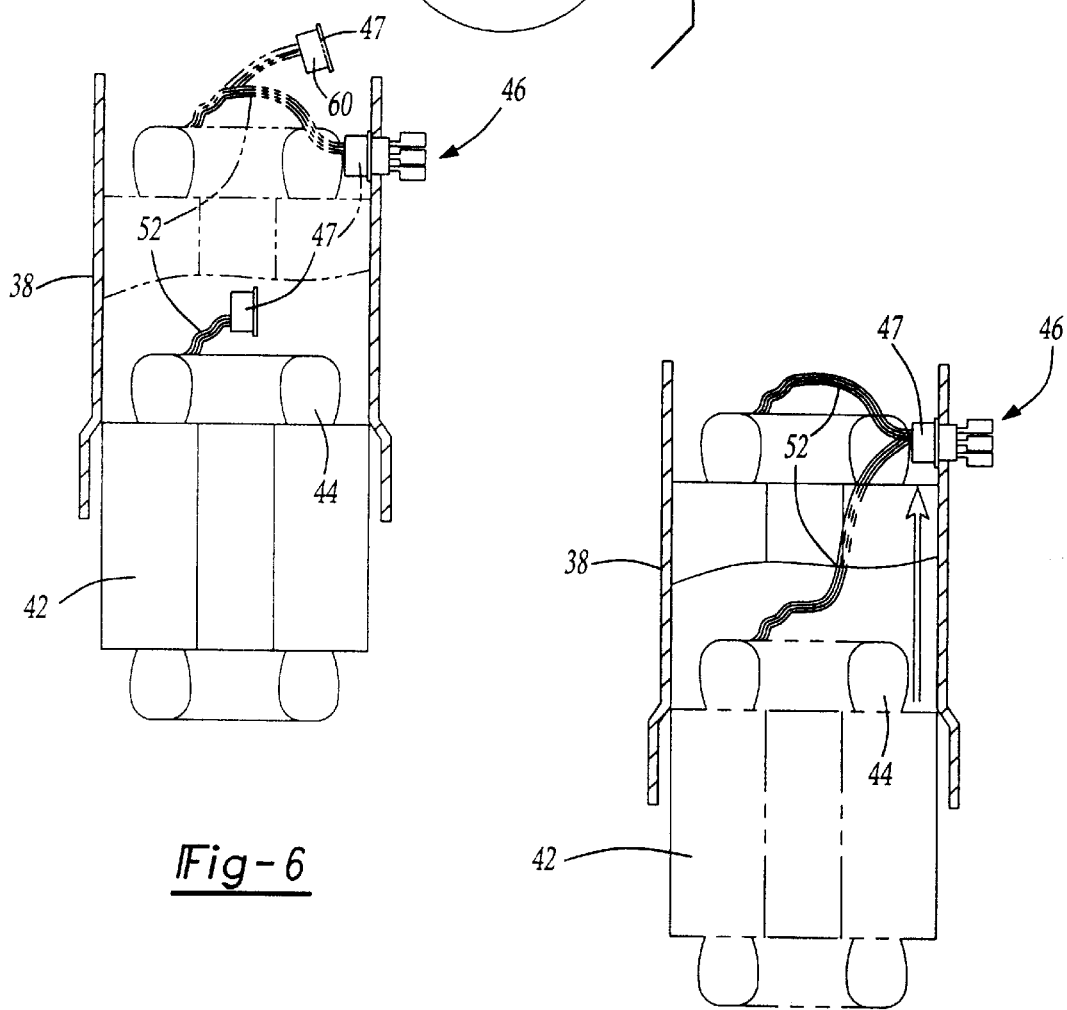
*Fig-6*
*Fig-7*

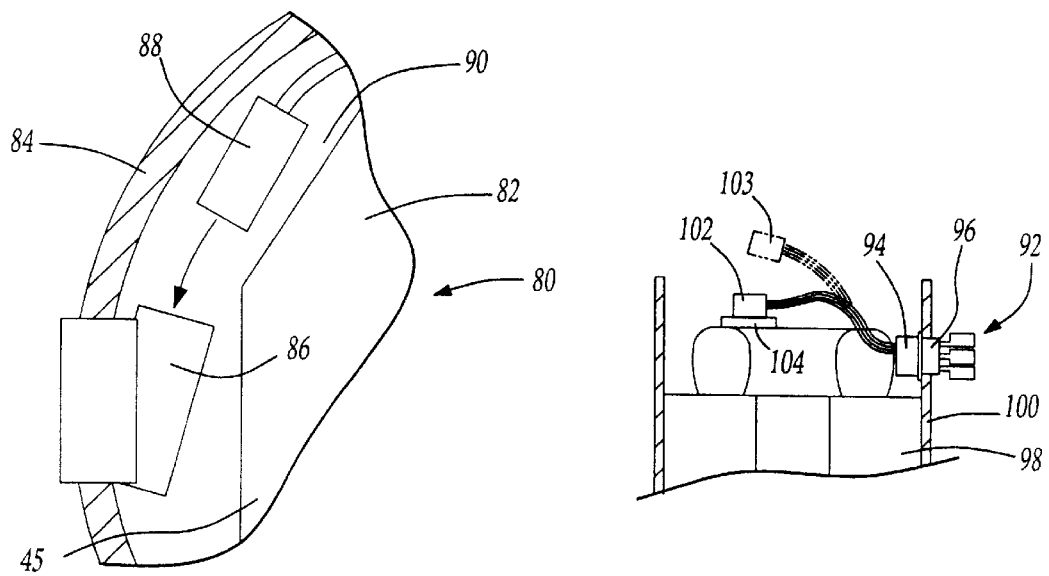
*Fig-8*
*Fig-9*
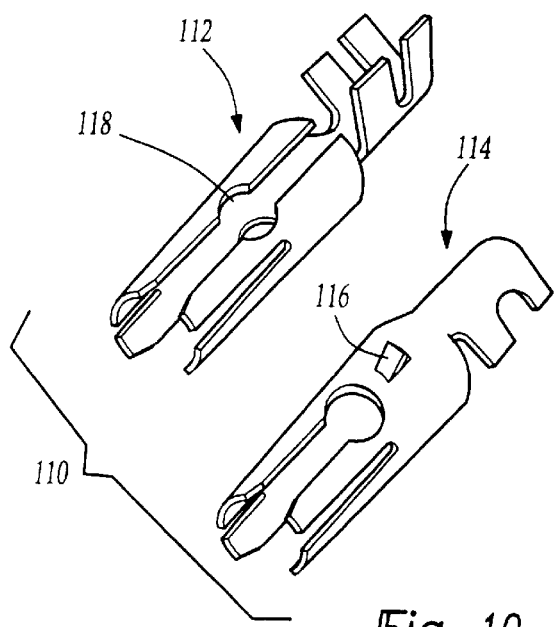
*Fig-10*

TERMINAL CONNECTION IN SMALL AREA OF SCROLL COMPRESSOR AND METHOD FOR CARRYING OUT SAME

BACKGROUND OF THE INVENTION

This invention relates to connecting power terminal connections in a sealed compressor preferably to reduce the length of the compressor unit.

Modern compressors often include a compressor pump unit mounted within a sealed housing structure. The sealed housing structure receives the compressor pump unit and an electric motor for driving the compressor pump unit. A crankcase supports the pump unit.

Refrigerant and oil are allowed to flow within the compressor housing to perform various functions such as cooling the motor, etc. Various structure assists in moving the oil throughout the compressor housing.

The electric motor includes a stator mounted in a lower portion of the housing below the crankcase. There is typically a "dead" space between the stator and the crankcase. This space is used for allowing connection of an electrical connection through the sealed housing and to the motor. The overall height of the scroll compressor is defined by the necessary components, such as the motor, crankcase, and other components, as well as the "dead" space between the stator and the crankcase.

It is, thus, desirable to eliminate this "dead" space and reduce the overall height of the scroll compressor. In some applications, there may be other areas that would be useful for packaging the electrical connection.

SUMMARY OF THE INVENTION

The present invention reduces the height of a sealed compressor. Preferably, the invention provides a connection at the stator winding level and a method for carrying out same so as to eliminate unnecessary space within the compressor housing.

In one embodiment, a terminal connection is made within the stator winding height of a compressor. The compressor includes a compressor pump unit, a motor for driving the compressor pump unit, and a housing surrounding the compressor pump unit and the motor. The motor includes a stator having stator windings and a rotor wherein the stator extends along an axis for a fixed axial length and the rotor rotates about the axis. A set of terminal pins extends through the housing for providing electrical connection of the motor. The terminal pins are mounted on the inside of the housing within an axial length of the stator to reduce the height of the scroll compressor.

A connector from the motor slides in a direction without a substantial radial component, and generally parallel, tangential or a combination thereof, to the axis of rotation, to connect the terminal pins to the motor. This is accomplished by incorporating slots into the connector for receiving the terminal pins. In one embodiment, the pins extend perpendicular to the axis of rotation, and in other embodiments in a direction parallel, tangential or a combination thereof to the axis of rotation between the housing and the stator. Stated another way, the pins are not normal to the shell, or radial to the axis.

To aid in packaging the connection within the stator winding level, the stator winding itself may be deformed inwardly toward the axis of rotation to allow connection of the connector and terminal pins. Alternatively, the housing may be deformed outwardly from the axis of rotation at an area around the terminal pins.

Also, the terminal pins preferably has a locking feature.

While the packaging of the connection adjacent the stator windings is most preferred, there may also be times when packaging the connection in a space within the axial length of another component, such as the crankcase, is preferred.

In a most preferred embodiment, the compressor pump unit is a scroll compressor.

These and other objects, features and advantages of the present invention can be best understood from the following specification and drawings, the following of which is a brief description.

BRIEF DESCRIPTION OF THE DRAWINGS

FIG. 2 is a top view of the stator according to a first embodiment of the present invention;

FIG. 3 is a cross-sectional view of the compressor housing according to a second embodiment of the present invention;

FIG. 4 is a perspective view of the terminal pins and mating connector according to a first connector configuration;

FIG. 5 is a perspective view of the terminal pins and mating connector according to a second connector configuration;

FIG. 6 is a cross-sectional view of the stator in the compressor housing illustrating the method for connecting the terminal pins to the motor; and FIG. 7 is a cross-sectional view of the stator in the compressor housing illustrating a second method for connecting the terminal pins to the motor.

FIG. 8 shows an alternative embodiment.

FIG. 9 shows an alternative embodiment

FIG. 10 shows a terminal pin embodiment.

DETAILED DESCRIPTION OF THE PREFERRED EMBODIMENT

Figure 1:
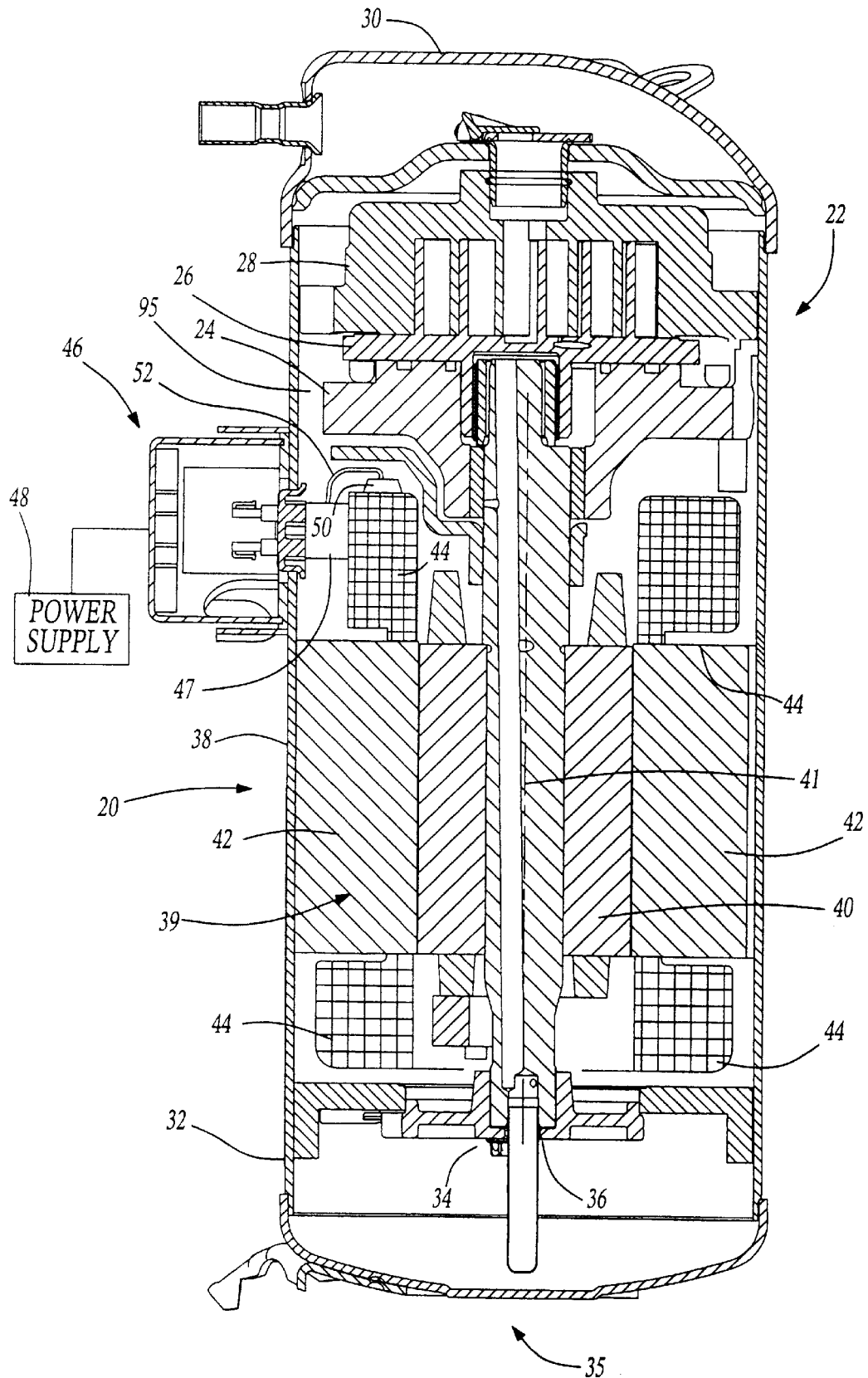
FIG. 1 is a cross-sectional view of the inventive connector incorporated in the compressor housing.

FIG. 1 is a cross-sectional view of a compressor incorporating the inventive connector. Compressor 20 is a scroll compressor and receives a pump unit 22 including a crankcase 24, an orbiting scroll 26, and a non-orbiting, or fixed scroll 28. An end cap 30 encloses the top end of the compressor 20. While a scroll compressor is illustrated, other compressor types can be used with the invention.

A lower bearing mount 32 receives a lower bearing 34. A lower end cap 35 closes the lower end of the compressor. The bearing 34 mounts a shaft 36. Between the end caps 30 and 35 a generally cylindrical housing 38 receives and encloses all components 24, 26, 28, 30, 32, 34, 36 and a motor 39, as shown in FIG. 1. The motor 39 includes a rotor 40 that rotates about an axis 41 and a stator 42 having stator windings 44.

In the prior art, space has been provided axially between the motor 39 and crankcase 24 to allow electrical connection to be made to the motor 39. In the present invention, however, the space is eliminated by having the electrical connection 46, including connector 47, located between the stator winding 44 and the inside wall of the housing 38. Electrical connection 46 is coupled to power supply 48, which supplies power to the motor 39. An appropriate motor protector 50 is also included in compressor 20 coupled to motor 39 and having wires 52 that extend from electrical connection 46 to motor protector 50.

As shown in FIG. 2, the stator windings 44 may be deformed as shown at 45 in order to accommodate connector 47 of electrical connection 46. In this case the windings 44 are deformed inwardly toward the axis 41. The deformation 45 can be done by blanking the windings when they are formed.

Alternatively, the cylindrical housing 38 may be deformed outwardly as shown at 49, and away from the axis 41 to accommodate the connector 47, as shown in FIG. 3.

Typically, electrical connections have been made by sliding a connector onto the terminal pins in a direction generally perpendicular to the rotational axis. This prior art type connector required the dead space.

Alternative connection configurations are shown in FIGS. 4 and 5 to accommodate placement of connector 47 between stator windings 44 and cylindrical housing 38. In FIG. 4, terminal pins 54 of electrical connection 46 extend generally perpendicular to the axis 41 of rotation. Connector 47 has cooperating slots 56 for receiving each of the pins 54 when slid onto the pins 54 downwardly in a direction generally parallel to the axis 41 of rotation.

In FIG. 5, terminal pins 54 are bent upward at a 90 degree angle so that they are parallel to axis 41. The cooperating slots 56 are, thus, positioned so that they can be slid onto pins 54 in the downward motion.

FIG. 6 illustrates the physical connection of connector 47 to electrical connection 46. The stator 42 is initially pressed or heat shrunk into housing 38. The connector 47 is connected to stator 42 by wires 52, but is unconnected to electrical connection 46, as shown in phantom at 60.

Connector 47 can then be slid onto the pins 54 of electrical connection 46 in a direction generally parallel to the axis of rotation.

The present invention, however, also allows the connector 47 to be slid onto the pins 54 first followed by placement of the stator 42, as shown in FIG. 7. With this embodiment, the prior art type connectors which slide in a direction perpendicular to the axis could also be used.

As shown in FIG. 8, another embodiment 80 incorporates a stator winding 82 positioned to be spaced from the shell 84. The connector 86 is positioned to receive the electrical connection 88 in a generally tangential direction relative to the shell 84. Thus, a space 90 allowing the tangential movement is added to one extreme of the space 45.

In sum, the terminal pin connections are positioned in a location such that they reduce the required space. The electrical connection is made by connecting the pins with a connector which moves in a direction that does not include a substantial radial component. Preferably the direction is parallel to the axis of rotation, tangential to the shell, or a combination of the two. Further, while the connection is shown within the axial length of the stator, other components may receive the connector. As an example, the connector could be positioned upwardly in the axial length of the crankcase, such as for example in the area generally indicated by 95 in FIG. 1.

FIG. 9 shows another embodiment 92, where the connection to the motor is made after the connector 94 has been attached to the terminal pins 96 and after the stator 98 has been attached to the housing 100. In one embodiment, a pigtail connector 102 is utilized which is connected to the terminal pins 96. Once that connection is made and motor stator 98 has been connected to the housing, the pigtail connection 102 is then connected to the motor 98 at 104. The pigtail connector 102 is shown in phantom at 103 unconnected to the motor, and in solid line connected to the motor. Again, the exact structure of the connector is within the skill of a worker in this art. It is the concept of such a connection which is inventive here.

FIG. 10 shows an embodiment 110 of the electrical connection wherein the connector and terminal pins 112 and 114 include a locking structure. In one example, a bump 116 is formed that will snap into an opening 118 in the opposed connector. This will prevent inadvertent movement of the pins relative to each other.

Although a preferred embodiment has been disclosed, a worker of ordinary skill in the art would recognize that certain modifications come within the scope of the invention. For that reason, the following claims should be studied to determine the true scope and content of this invention.

What is claimed is:

1. A sealed compressor comprising:

a compressor pump unit;

a motor for driving said compressor pump unit;

a housing surrounding said compressor pump unit and said motor, said motor having a stator and a rotor, said stator extending along an axis for an axial length and said rotor rotating about the axis;

a set of terminal pins mounted to said housing for providing electrical connection to said motor, said terminal pins being mounted onto said housing within said axial length of said stator; and a connector that slides in a direction with a substantial radial component relative to said axis of rotation to connect to said terminal pins to said motor.

2. The sealed compressor as recited in claim 1, wherein said direction also includes a generally tangential component to an inner surface of said housing.

3. The sealed compressor as recited in claim 1, wherein said connector has slots for receiving the terminal pins.

4. The sealed compressor as recited in claim 1, wherein said terminal pins extend perpendicular to the axis of rotation and between said housing and said stator.

5. The sealed compressor as recited in claim 1, wherein said stator has windings deformed inwardly toward said axis of rotation to provide space for said connector and terminal pins.

6. The sealed compressor as recited in claim 1, wherein said housing is deformed outwardly from said axis of rotation at an area around said terminal pins to provide space for said connector and terminal pins.

7. The sealed compressor as recited in claim 1, wherein said connector has a locking structure to maintain connection attachment between connector and terminal pins.

8. The seaed compressor as recited in claim 1, wherein said pump unit is a scroll compressor pump unit.

9. A method of assembling a compressor comprising the steps of:

(1) providing a compressor pump unit, a motor for driving said compressor pump unit, and a housing surrounding said compressor pump unit and said motor, said motor provided with a stator and a rotor wherein said stator has stator windings and extends along an axis for a fixed axial length and said rotor rotates about said axis;

(2) mounting a set of terminal pins for controlling said motor on an inside surface of said housing within an axial length of said stator;

(3) connecting a connector onto said terminal pins; and (4) mounting said stator to said housing after connecting said connector onto said terminal pins.

10. A method as recited in claim 11, wherein said connector slides onto said terminal pins in a direction generally normal to said housing.

11. A method as recited in claim 11, wherein said connection of said connector to said terminal pins occurs prior to said connector being connected to said motor to provide a motor supply.

* * * * *

UNITED STATES PATENT AND TRADEMARK OFFICE
CERTIFICATE OF CORRECTION

PATENT NO.    : 6,315,528 B1  Page 1 of 1
DATED         : November 13, 2001
INVENTOR(S)   : Williams et al.

It is certified that error appears in the above-identified patent and that said Letters Patent is hereby corrected as shown below:

<u>Column 4,</u>
Line 19, "with" should be -- without --.

Signed and Sealed this

Fifteenth Day of April, 2003

JAMES E. ROGAN
*Director of the United States Patent and Trademark Office*